United States Patent [19]
Rozman et al.

[11] Patent Number: 5,747,971
[45] Date of Patent: May 5, 1998

[54] POSITION AND VELOCITY SENSORLESS CONTROL FOR A MOTOR GENERATOR SYSTEM OPERATED AS A MOTOR USING EXCITER IMPEDANCE

[75] Inventors: Gregory L. Rozman, Rockford; Albert L. Markunas, Roscoe; Michael J. Hanson, Loves Park; Leland E. Weber, Winnebago, all of Ill.

[73] Assignee: Sundstrand Corporation, Rockford, Ill.

[21] Appl. No.: 694,081

[22] Filed: Aug. 8, 1996

[51] Int. Cl.$^6$ .................................................. H02K 29/06
[52] U.S. Cl. ........................ 322/10; 322/14; 322/24; 322/46; 318/801
[58] Field of Search ........................ 322/62, 28, 10, 322/20, 29

[56] References Cited

U.S. PATENT DOCUMENTS

| | | | |
|---|---|---|---|
| 5,384,527 | 1/1995 | Rozman et al. | 322/10 |
| 5,461,293 | 10/1995 | Rozman et al. | 318/603 |
| 5,493,200 | 2/1996 | Rozman et al. | 322/10 |
| 5,541,488 | 7/1996 | Bansal et al. | 318/801 |
| 5,581,168 | 12/1996 | Rozman et al. | 318/723 |
| 5,594,322 | 1/1997 | Rozman et al. | 322/10 |

*Primary Examiner*—Steven L. Stephan
*Assistant Examiner*—Nicholas Ponomarenko
*Attorney, Agent, or Firm*—Antonelli, Terry, Stout & Kraus

[57] ABSTRACT

A motor generator system (120) in accordance with the invention includes a prime mover (21) for driving an output shaft (18), a main motor generator (105), having a rotor driven by the output shaft, for producing electrical power on at least one output winding (36a–36c) in response to the prime mover rotating the output shaft and for driving the output shaft in response to operation as a motor; an exciter (102) for applying excitation to a field winding (34) of the main motor generator during operation for producing electrical power on the at least one output winding and for applying current to the field winding of the main motor and generator to produce a magnetic field in the field winding during operation of the main motor generator as a motor; circuitry (122), responsive to current in a field winding (204) of the exciter, for producing an output signal representing a position of the rotor of the main motor generator driven by the output shaft; and a main inverter (114), responsive to the output signal, for commutating application of electrical current to the at least one output winding to control operation of the main motor generator during operation as a motor.

21 Claims, 4 Drawing Sheets

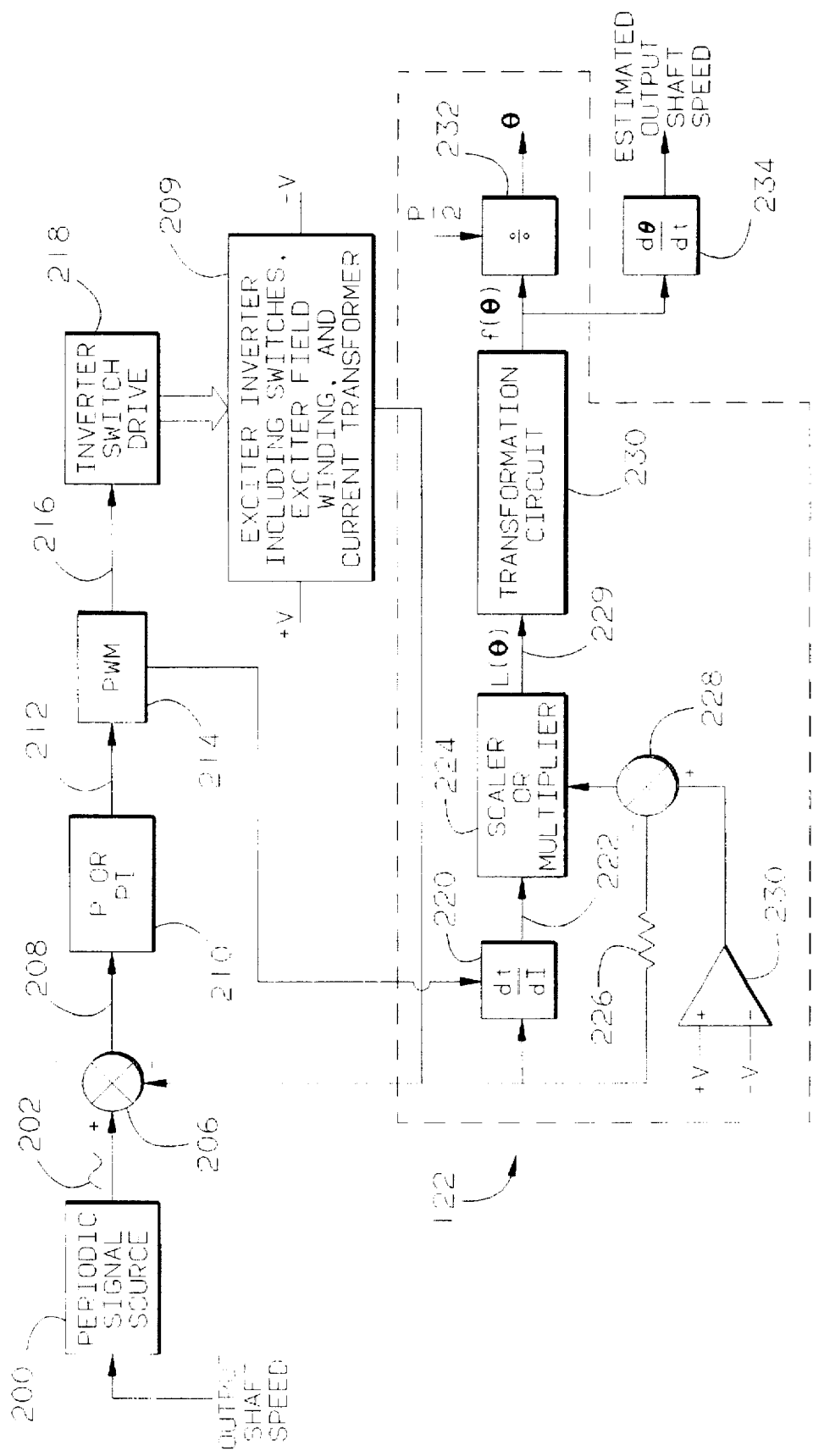

POSITION AND VELOCITY SENSORLESS CONTROL FOR A MOTOR GENERATOR SYSTEM OPERATED AS A MOTOR USING EXCITER IMPEDANCE

TECHNICAL FIELD

The present invention relates to systems and methods of operation of a motor generator system for controlling commutation during synchronous motor operation.

BACKGROUND ART

Previously developed motor generator systems usually include an absolute rotor position sensor such as resolver, synchro, optical encoder or Hall effect devices for detecting the rotor position to provide proper commutation of switching of currents in the armature windings during motoring mode. For example, U.S. Pat. No. 3,902,073 discloses three Hall devices mounted in the air gap of a permanent motor generator (PMG) spaced 120 electrical degrees apart with respect to the permanent magnet pole pairs and in magnetic flux sensing relationship to the rotor permanent magnets. A voltage is generated across each Hall device which is proportional to the magnetic flux density applied thereto. Thus, as the rotor of the PMG rotates, the voltage across each Hall device varies from zero to a maximum as a function of the flux density thereby generating three trapezoidal voltages spaced 120° apart. The output from each Hall device is representative of the position of the PMG rotor. If the rotor of the PMG is constructed to have the same number of pole pairs as the main motor generator and the poles of the PMG are aligned with the poles of the main motor generator, the main motor generator rotor position is known if the PMG rotor position is known. The output signals from the Hall devices are used to control switching of ganged elements in cycloconverters to switch current to the proper winding in the armature of the main motor generator.

Use of an external position sensor is associated with a considerable expense in itself, associated electronics, wiring and installation. Often the operating speed limits the accuracy of available position sensors, such as for example a resolver. Further operating temperature ranges in typical motor generator systems limit the accuracy of the Hall devices.

These problems are the motivating factors to use other means to detect rotor position. In the case of brushless DC motor, a back electromotive force (EMF) approach was the most popular method of detecting rotor position. The back EMF signal contains information on the rotating magnetic rotor position $$E_{EMF} = K\omega \sin\alpha$$

where:

K is a Constant $\omega$ is angular speed and $\alpha$ is phase $\angle$

There are two methods of detecting back EMF voltage: the direct method and indirect method. The direct method is based on directly measuring the phase voltage. The phase voltage is equal to the back EMF when the phase is not energized and the winding is not short-circuited.

Certain existing auxiliary power units (APU) do not utilize a PMG and therefore sensorless operation to produce commutation must be achieved by other means. Back EMF voltage of the main motor generator is zero at standstill and therefore can not be used for commutation at zero and low speeds. The ability to rapidly accelerate a synchronous main motor generator which is used to start a prime mover such as a gas turbine in an APU is important when a single phase excitation is used to avoid high voltage application to the exciter windings which can produce potential corona problems at high altitude.

To satisfy the above requirements one of the phase legs must be turned off, which requires 120° conduction in the commutation algorithm and the voltage reading must be taken after some delay following switching the motor winding off to assure complete current decay via the freewheeling diodes. This direct technique is described in a paper entitled "Microcomputer Control for Sensorless Brushless Motor" by Kenichi Iizuka et al. published in the IEEE Transactions On Industry Application, Vol. 21, No. 4, May/June 1985.

The indirect method is based on estimating the back EMF from the motor terminal voltage and phase currents. This method is suitable for both 120° and 180° conduction. One technique of using this method is described in a paper entitled "A Position-and-Velocity Sensorless Control for Brushless DC Motor Using an Adaptive Sliding Mode Observer" by Takeshi Furuhashi et al., published in the IEEE Transactions on Industrial Electronics, Vol. 39, No. 2, April 1992.

Since the back EMF voltage is zero at standstill and the signal to noise ratio is small at low speeds, the reliable determination of the rotor position is limited at low rotor speeds.

A method with a wider speed range is required for self-commututated sensorless operation. Such a method of using PMG as a position sensor for motor generator starting applications is described in U.S. Pat. No. 5,140,245. The system is equipped with a PMG which is used as an emergency electric power source and for control power during normal (generating) mode of operation. A multiphase output of the PMG is applied to a high resolution phase locked loop having a binary counter with an output phase locked to the PMG multiphase output and representing shaft position.

FIG. 1 illustrates a block diagram of a prior art brushless motor generator system which may be operated as a main generator and further as a motor to start a prime mover. A complete description of the system of FIG. 1 appears in U.S. Pat. No. 5,493,200 which is assigned to the assignee of the present invention and which is incorporated herein by reference in its entirety.

Referring now to FIG. 1, a brushless, synchronous motor generator system 10 includes a PMG 12, an exciter 14 and a main motor generator 16. The generator system 10 further includes a motive power shaft 18 connected to a rotor 20 of the generator system. The motive power shaft 18 may be coupled to a prime mover 21, which may comprise, for example, a gas turbine engine. The generator system 10 and the prime mover 21 may comprise portions of an APU or any other power conversion system.

The rotor 20 carries one or more permanent magnets 22 which are poles of the PMG 12. Rotation of the motive power shaft 18 causes relative movement, between the magnetic flux produced by the permanent magnet 22 and a set of three-phase PMG armature windings mounted within a stator 26 of the motor generator system 10.

The exciter 14 has a field winding 28 disposed in the stator 26 and a set of three-phase armature windings 30a–30c disposed in the rotor 20. A set of three-phase main motor generator armature windings 36a–36c is disposed in the stator 26.

During operation in a generating mode, the PMG armature windings 24a–24c are coupled through a rectifier 38, a voltage regulator 40 and a pair of switches 42 and 44 to end taps 46a and 46b of the exciter field winding 28. As the motive power shaft 18 is rotated, power produced in the PMG armature windings 24a–24c is regulated in potential by voltage regulator 40, rectified by rotating rectifier 32 and applied to the main motor generator field winding 34. Rotation of the motive power shaft 18 and the field winding 34 induces the three-phase AC voltages in the main motor generator armature windings 36a–36c as is conventional.

Often, it is desirable to use the brushless generator 10 as a motor to bring the prime mover 21 up to self-sustaining speed. This operation is accomplished by providing electrical power to the main generator field winding 34 via the exciter 14 to produce a required magnetic field therein for motor operation, providing AC power to the main motor generator armature phase windings 36a–36c, via lines 48a–48c and suitably commutating the currents flowing in the windings 36a–36c to cause the motive power shaft 18 to rotate. This operation may be achieved by connecting an external electrical power source 50 to power conversion system 54. The power conversion system 54 may be a main inverter as described below which commutates the current in the windings 36a–36c in response to a rotor position signal representing the rotary position of the rotor of the main motor generator 16 and further an exciter inverter which provides the necessary alternating current to the exciter field winding 28 for operation as a motor. A series of switches 56a–56c, as well as the switches 42 and 44, are moved to the positions opposite that shown in FIG. 1 so that the power conversion system 54 is coupled to the end taps 46a and 46b of the exciter field winding 28. The power conversion system 54 is operated to supply power as appropriate to the phase windings 36a–36c and the field winding 28 to cause the motive power shaft 18 to rotate and thus develop motive power.

During operation in the generating mode, the switches 56a–56c are placed in the positions shown in FIG. 1 and the power conversion system 54 is operated to produce constant-frequency AC power on a load bus 60.

Commutation of the electrical currents in the output windings 36a–36c is achieved during motor operation under the control of a rotor position detector which utilizes inductance sensing of the inductance in the windings 36a–36c. See column 13, lines 58–67 through column 14, lines 1–10 of U.S. Pat. No. 5,493,200.

Additional motor generator systems of the assignee which are used for power generators and starting applications of prime movers are disclosed in U.S. Pat. Nos. 4,330,743, 4,616,166, 4,937,508, 5,068,590, 5,495,162, 5,444,349, 5,488,286, 5,461,293 and 5,495,163 which patents are herein incorporated by reference in their entirety. None of these patents disclose detection of the rotor position during motor operation of a main motor generator or an output shaft of a prime mover which drives rotors of at least the exciter and the main motor generator to drive the prime mover in response to excitation of the field winding of an exciter to determine cyclical variation of exciter field winding inductance which is also representative of the rotary position of the prime mover output shaft and rotary position of the rotors.

FIG. 2 illustrates a block diagram of a prior art motor generator system 100 having a PMG (not illustrated), an exciter 102 and a main motor generator 105 all of which are driven by an output shaft of a prime mover (not illustrated) with a configuration such as illustrated in the prior art of FIG. 1. The system 100 is operated in a starting mode with an AC source 106 providing three phase alternating current to a full wave rectifier 108 which outputs DC potentials of +V and −V on a DC bus 108. Exciter inverter 110 applies AC excitation to the field winding within the exciter 102. The rotor of the exciter 102 has induced therein three-phase current as a consequence of the field current. The rotating rectifier assembly 104 produces three-phase full wave rectification of the three-phase AC produced by the exciter rotor. The direct current produced by the rotating rectifier 104 is applied to the field winding of the main motor generator 105 which is contained in the rotor thereof. As illustrated, a rotating assembly 112 includes the rotor of the exciter, the three-phase full wave rectifier 104 and the field winding of the main motor generator 105. A main inverter 114 commutates the application three-phase alternating current for applying electrical power to the at least one output winding of the main motor generator 105 which functions to produce three-phase 400 Hz alternating current in applications in air frames. The main inverter 114 may be the inverter as illustrated in FIG. 4 of the assignee's U.S. Pat. No. 5,495,163. The exciter inverter control 116 controls the activation of the exciter inverter 110 and may be the exciter inverter control disclosed in FIG. 4 of the assignee's aforementioned U.S. Pat. No. 5,493,200. The main inverter control 118 and the rotor position sensor 119 may be in accordance with FIG. 2 of the assignee's U.S. Pat. No. 5,461,293.

DISCLOSURE OF THE INVENTION

The present invention utilizes the impedance of an exciter field winding during motoring mode to determine the position of the rotor of the main motor generator from a standstill up to operating speed of a main motor generator when the main motor generator is operated as a motor which rotor position is used to commutate current in each stator output winding during the motoring mode. With the invention, the aforementioned determination of the position of the rotor of the main motor generator which is driven by an output shaft of the prime mover which drives rotors of at least the exciter and main motor generator and an optional PMG during generator operation is determined by producing a signal representative of the variation of the inductance of the field winding of the exciter and transforming the variation of the inductance of the field winding of the exciter as a function of the rotor position into a signal representing the position of the rotor of the main motor generator and the output shaft to control commutation of electrical current in each stator output winding of the main motor generator. Once the position of the rotor of the main motor generator and the output shaft is accurately determined, commutation is controlled in the conventional manner by a main inverter which applies electrical currents to the at least one output stator winding of the main motor generator. The detection of the position of the rotor of the main motor generator and the output shaft in response to current in the exciter field winding is used to operate the main motor generator as a synchronous machine and produces sufficient torque to drive high inertia loads such as a gas turbine prime mover without the prior art's utilization of auxiliary starting devices such as DC motors or an air turbine.

Acceleration of the main motor generator in a synchronous mode is produced by driving the at least one stator output winding of the main motor generator with the main inverter producing a variable frequency alternating current which has a frequency which is gradually increased until the rotor of the main motor generator which is attached to the output shaft of the prime mover has accelerated to a speed at which the prime mover such as a gas turbine is producing sufficient torque to be self sustaining. After self sustaining speed is reached, the input current to the at least one stator output winding of the main motor generator is removed. The position of the rotor of the main motor generator, because it and the exciter rotor are mechanically driven by the output shaft of the prime mover, is detected by using exciter field current.

The rate of change of in the field current of the exciter depends on incremental inductance which in turn is a rotor position dependent variable due to the saliency of the poles of the exciter. The equation governing the flow of exciter field current is expressed as follows:

$$V = RI + L(\theta)\frac{dI}{dt}$$

where

V equals the voltage across the exciter field winding, $\theta$ is the rotary position of the prime mover output shaft and the rotor of the main motor generator, I is the instantaneous current in the exciter field winding and L is the instantaneous exciter field winding inductance. During starting, a pulse width modulated signal having a fundamental frequency is applied to the field winding of the exciter. The fundamental frequency and the switching rate of the pulse width modulated signal both have a frequency much higher than the rotational velocity of the prime mover output shaft and the rotors. The switching rate produces numerous pulses suitably modulated in width which are outputted to produce each cycle of the fundamental frequency. In a typical application, the fundamental frequency is between 400 and 1000 KHz and the switching rate is between 10 and 20 KHz. Therefore, the following equation applies to describe the cyclical variation of the inductance of the field winding of the exciter:

$$L(\theta) = (v - RI)\frac{\Delta t}{\Delta i}$$

and $$\theta = F^{-1}(L)$$

with $F^{-1}$ being a transformation converting the variation of inductance as a function of output shaft position and rotor position of the main motor generator into a signal representing the output shaft and main motor generator rotor position.

The transformation is preformed preferably with a lookup table which is accessed by a digital signal processor. The time varying variation of the inductance of the current pulsed exciter field winding for the fundamental frequency excitation of the field winding must be mapped into 360° of data points which represent the required rotary position resolution of the output shaft and main motor generator rotor required for current commutation of the stator output windings of the main motor generator. The variation $L(\theta)$ will be periodic but not a clean sinusoidal wave at the fundamental excitation frequency of the field winding of the exciter. The mapping of the lookup table will be unique to each exciter geometry. The digital signal processor will further determine the slope of the variation $L(\theta)$ to resolve in which quadrant of the 360° of rotation the sampled inductance $L(\theta)$ is contained to provide proper detection of the value of $\theta$ over 360°. The rotary position $\theta$ is preferably converted into a sawtooth waveform which represents the main motor generator rotor position required for commutation.

The control of the exciter field current is with a conventional full (H) bridge inverter operated in a current control mode. The excitation current is scaled to be inversely proportional to rotor speed to reduce back EMF at high speed. Exciter field current is used to generate a signal which represents the variation of exciter field winding inductance which is converted into a signal representing rotor position according to the above equations. The output of the transformation $F^{-1}$ above must be divided by the number of pairs of poles of the exciter to obtain the mechanical position of the rotor of the main motor generator. The speed of the rotor can be produced by simple differentiation of the signal representing the rotor mechanical position.

Control of switching of the main inverter for driving the at least one stator output winding of the main motor generator is conventional and is not part of the present invention.

The generation of an output signal representing a position of the output shaft of the prime mover and the position of the rotors of at least the exciter and the main motor generator is produced by circuitry which is responsive to current in the field winding of the exciter. The circuitry is responsive to a variation in inductance of the field winding for producing the rotary position signal representing the rotary position of the output shaft and the at least the rotors of the exciter and main motor generator. A main inverter for driving the at least one stator output winding of the main motor generator is responsive to the rotary position signal representing the rotary position of the output shaft and the rotors for controlling commutation of electrical current in the at least one stator output winding to control operation of the main motor generator during operation as a motor.

An inverter is coupled to the field winding of the exciter and to the pulse width modulated output signal for switching current flow through the field winding of the exciter to produce current flow therein at the fundamental frequency of the pulse width modulated output signal.

The circuitry for producing the rotor position signal of the output shaft and the rotor of the main motor generator includes a first differentiation circuit responsive to the current in the exciter field winding for producing an output signal representing the inverse slope of the change of current over time in the exciter field winding during each pulse of the pulse width modulated output signal which is a function of inductance of the exciter field winding which is a function of the rotary position of the output shaft and rotor of the main motor generator. A transformation circuit is responsive to the output of the first differentiation circuit for producing an output signal which is a function of the position of the output shaft and rotor of the main motor generator. A divider is coupled to the output signal of the transformation circuit for dividing the output signal of the transformation circuit by a number of pole pairs in the exciter to produce the output signal representing the rotary position of the output shaft and the rotor of the main motor generator. A scaling circuit is coupled between an output of the first differentiation circuit to convert the inverse of the slope of exciter field current over time to be independent of variation in a direct current voltage applied to the exciter inverter and the voltage drop caused by the resistance of the exciter field winding.

A first summer provides a difference between a first input and a second input with an output being coupled to the pulse width modulator. The first input is from the periodic signal source and the second input is a feedback signal representative of the current in the exciter field winding. The first input is amplitude modulated with a signal proportional to a speed of the output shaft and rotor of the main motor generator to decrease the first input to the first summer as a function of an increase in the speed of the output shaft.

A second summer provides a difference between a first input and a second input on an output which is coupled to the scaling circuit for controlling the scaling circuit. The first input is a difference between positive and negative direct current potentials applied to the exciter inverter and the second input is responsive to the current in the exciter winding less a voltage drop proportional to the drop on the resistance of the exciter winding caused by the exciter current.

A second differentiation circuit is responsive to the output of the transformation circuit for producing an output signal representing the speed of the output shaft. The signal representing the speed of the output shaft is preferably the signal used for amplitude modulating the fundamental frequency of the periodic signal source.

A preferred embodiment of the motor generator system further includes a PMG. The PMG, the exciter and the main motor generator have three phases and rotors mounted on the output shaft. The PMG, exciter and main motor generator are brushless and the prime mover is preferably a gas turbine.

BRIEF DESCRIPTION OF THE DRAWINGS

FIG. 4 is a block diagram of an embodiment of circuitry for detecting rotor position in a motor generator system in accordance with the present invention.

Like numerals identify like parts through out the drawings.

BEST MODE FOR CARRYING OUT THE INVENTION

Figure 1:
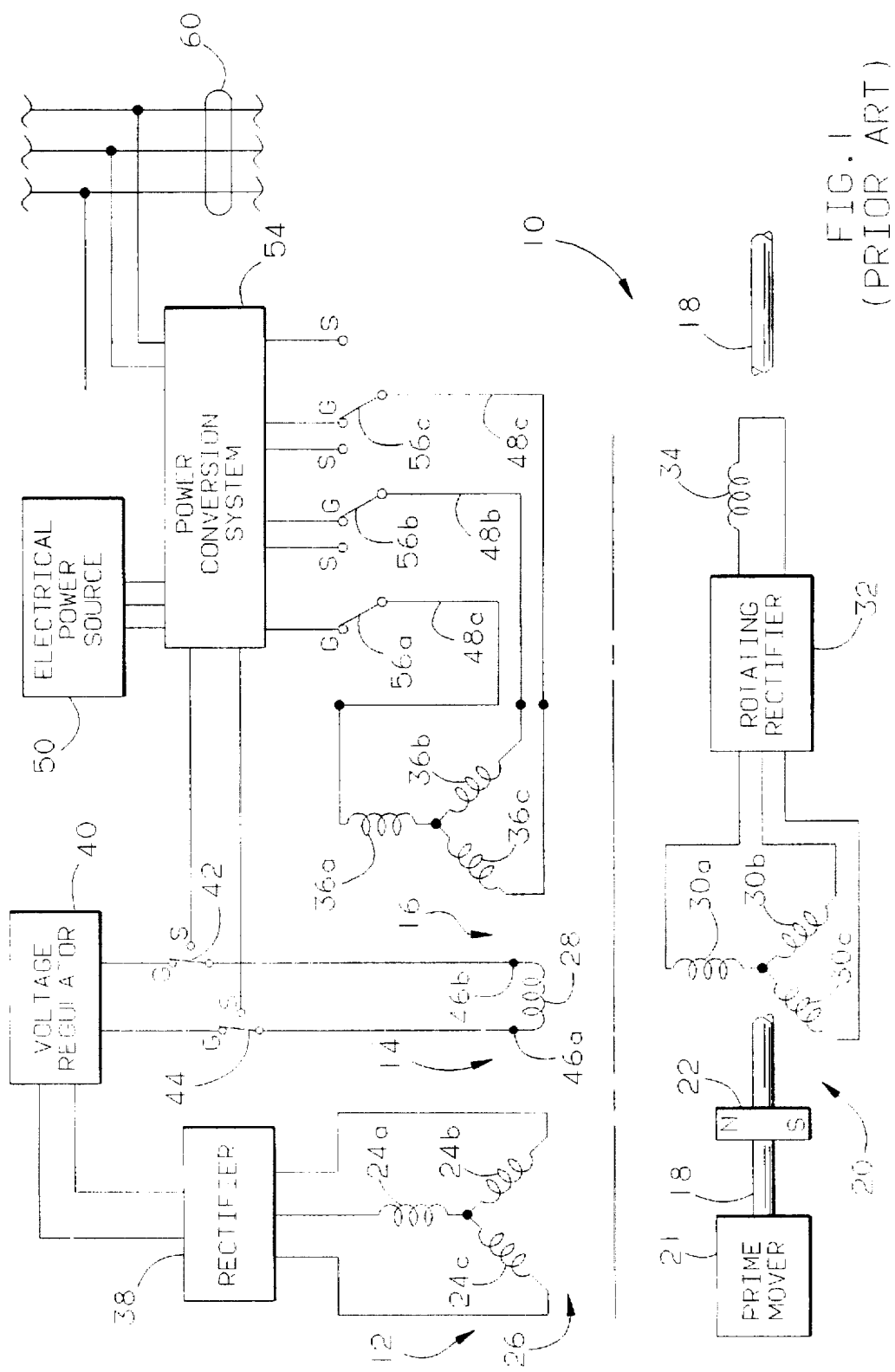
FIG. 1 is a block diagram of a prior art brushless motor generating system used for starting a prime mover and further a preferred form of a motor generator system in which the present invention is practiced.
Figure 2:
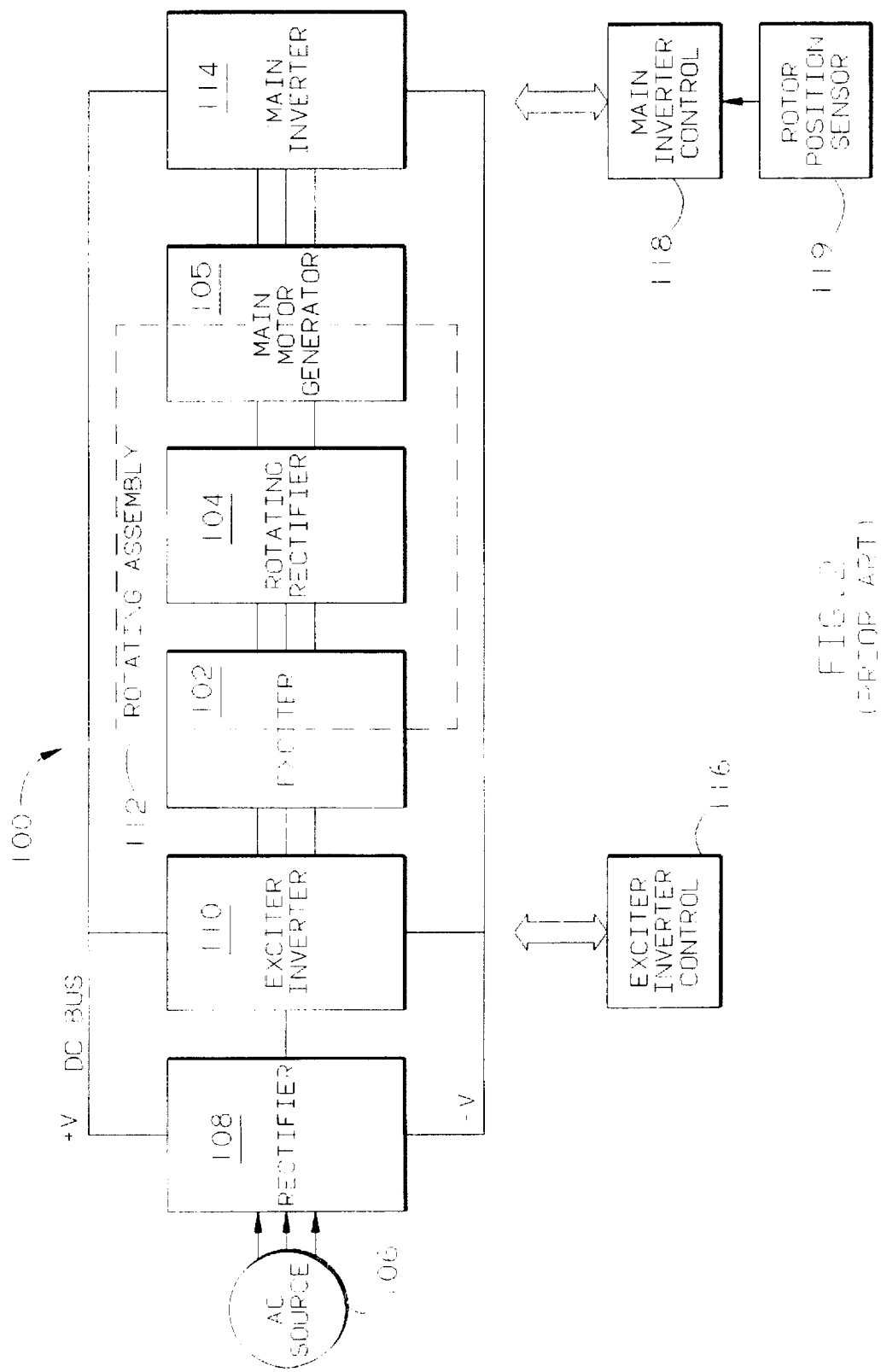
FIG. 2 is a block diagram of a prior art brushless generator motor system used for starting a prime mover.
Figure 3:
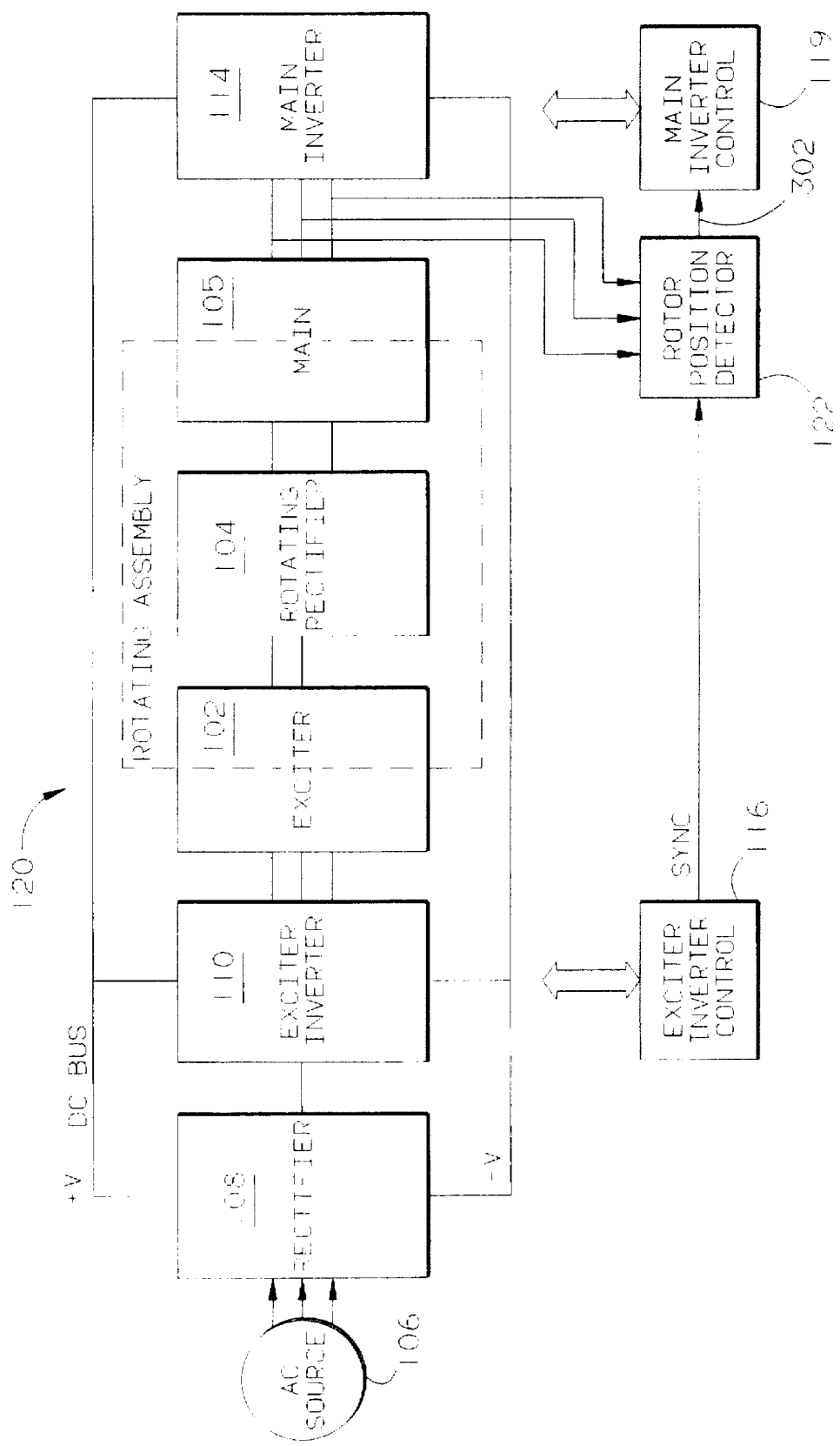
FIG. 3 is a block diagram of a preferred embodiment of sensorless motor generator system used for starting a prime mover in accordance with the invention.

FIG. 3 illustrates a block diagram of an embodiment of a motor generator system 120 in accordance with the present invention used in a starting mode of a prime mover. The motor generator system 120 preferably contains a PMG (not illustrated), exciter 102 and main motor generator 105 including rotors and windings etc. as illustrated in FIG. 1. The output shaft of a prime mover (not illustrated) in accordance with the prior art of FIG. 1 drives the rotors of the PGM, exciter 102 and the main motor generator. The difference between the present invention used for starting of a prime mover as illustrated in block diagram form in FIG. 3 and the prior art of FIG. 2 is that the rotor position detector 122 is responsive to the exciter inverter control 116 to produce a rotor position signal which controls commutation of current in the at least one stator output winding of the main motor generator 105 and more specifically the cyclical variation of inductance caused by current flow in the field winding of the exciter 102 which is driven by the exciter inverter control 116 as described below in FIG. 4 is used to generate the rotor position control signal of the rotor of the main motor generator to control commutation of current. As will be described in more detail below in conjunction with FIG. 4, the rotor position detector 122 in response to activation of the field winding of the exciter 102 with a pulse width modulation signal senses the instantaneous inductance of the field winding of the exciter which varies as a function of the rotary position of the motor generator. The rotor position detector 122 transforms the variation of exciter field winding inductance as a function of rotor position of the motor generator into a rotor position signal. The rotor position signal produced by the rotor position detector 122 representing the position of the rotor of the motor generator may be used by the main inverter control 119 to accurately control commutation of the main inverter 114 by application to the main inverter control 119. The control of the main inverter 114 by the main inverter control 119 is in accordance with the prior art with the difference between the prior art and the present invention being that the position of the rotor of the main generator 105 is generated in response to variation in the inductance of the field winding of the exciter 102 as described below in detail.

FIG. 4 illustrates an embodiment of a rotor position detector 122 enclosed in a dotted line box in FIG. 4. A periodic signal source 200 produces an output sinusoidal waveform 202 having a frequency above the highest commutation speed of the switches in the main inverter 114. Typical frequencies of the sinusoidal wave produced by the periodic signal source 200 are between 400 and 1,000 Hz. The output envelope of the sinusoidal waveform 202 is amplitude modulated inversely in proportion to an output shaft speed signal representing the speed of rotation of the output shaft of the prime mover to which the rotors of the exciter 104 and the main motor generator 105 are connected as illustrated for example in FIG. 1. The purpose of modulating the amplitude of the sinusoidal waveform 202 inversely in proportion to the output shaft speed is to provide field weakening. A feedback current representing the current in the exciter field winding is applied to a subtracting input of summer 206 which computes a difference between the amplitude modulated sinusoidal waveform 202 applied to an additive input of the summer. The output signal 208, which is equal to the difference between the amplitude modulated sinusoidal waveform 202 and the feedback from the exciter field winding, is an error control voltage causing the alternating current in the exciter field winding to track the sinusoidal waveform 202. The output error control signal on output 208 is applied to a proportional or proportional and integrating amplifier 210. If an integrating function is used therein, it is for the purpose of reducing steady state error. However, only proportional amplification of the error control signal outputted by summer 206 may be used. The output 212 of the proportional or proportional and integrating amplifier 210 is applied to a pulse width modulator 214 which has a steady state switching frequency between 10 and 20 KHz and produces a square wave output when the input 212 is zero. The output 216 of the pulse width modulator 214 is applied to inverter switch drive 218 which provides switching control signals for the switches in a known manner to a conventional full or H bridge inverter which controls the flow of current in the exciter field winding which is illustrated as being within the block 204 which also contains the exciter inverter including switches, exciter field winding and current transformer to produce current flow in the exciter field winding which accurately tracks the frequency of sinusoidal waveform 202. The exciter inverter is driven by DC potentials of +V and −V. The aforementioned parts of the exciter are conventional as used in a starting mode in accordance with the prior art system as illustrated in FIG. 2.

The saliency of the rotor poles of the exciter causes the inductance of the field windings of the exciter to vary as a function of rotor position θ. The variation in inductance is detected and used to generate the rotor position signal θ required to control commutation by the main inverter control 119 of FIG. 3.

The output pulses from the pulse width modulator 214 are applied to a first differentiation circuit 220 which computes the slope which is the inverse of the change in current of the exciter field current in time. A scaler or multiplier 224 is coupled to the output 222 of the first differentiation circuit 220 to scale the output from the first differentiation circuit to normalize it to be independent of variation in the DC potentials +V and −V applied to the exciter field winding by the switches of the inverter 204 and voltage drop on the resistance component of the impedance of the exciter field windings.

Summer 228 has a first input from a differential amplifier 230 which computes the difference between the DC potentials +V and −V applied to the exciter field winding by the inverter 204. A second input to the summer 228 subtracts the voltage drop across resistance 226 representing the voltage drop access of the field windings of the exciter. The output 229 from the scaler or multiplier 224 represents the inductance L of the exciter winding as a function of rotor position θ of the main motor generator 105 and the output shaft of the prime mover as illustrated in FIG. 1.

Transformation circuit 230 converts the input 226, which represents the variation of the inductance L as a function of rotor position θ, into an output signal f(θ) which is a function of the rotor position θ. In order to produce an appropriately scaled output signal θ which represents the rotary position of the rotor of the main motor generator 105, and the output shaft of the prime mover, it is necessary to divide the output signal f(θ) from the transformation circuit 230 by a scaling factor equal to the number of pole pairs of the exciter. The scaling is performed by a dividing circuit 232 which produces the output θ representing the rotary position of the main motor generator exciter rotor and the output shaft position of the prime mover. The output from the transformation circuit 230 may be differentiated by a second differentiation circuit 234 to produce an estimated output shaft speed which may be used as the input to the periodic signal source 200.

The transformation circuit 230 implements an empirical mapping of the measured L(θ) into an output signal which represents rotary position. The transformation circuit 230 is preferably implemented with a lookup table containing data points sufficient in number to provide the required angular rotor position resolution to control commutation. The data points are empirically derived by correlating the signal L(θ) for each exciter with a measured rotor position for each data point. A digital signal processor may be used to control sampling of the analog voltage representing L(θ), perform A to D conversion, slope computation of the charge L(θ) necessary to map L(θ) in to a correct quadrant of the periodic variation over 360° of rotor position to provide determinate position resolution and optional conversion into a sawtooth wave which linearly varies from zero to a maximum over 360° of output shaft and rotor revolution which may be used by the main inverter control 119 to control commutation.

The control of the pulse width modulator 214 may be modified from a current control mode to a voltage control mode. In this circumstance, the feedback of a signal representative of the current in the exciter winding to summer 206 and the proportional or proportional and integral amplifier 210 would be eliminated.

The present invention provides sensorless detection of the rotor position of the main rotor of the main motor generator 105 through detection of periodic variation in the inductance of the field winding of the exciter 102 in response to periodic excitation from pulse width modulator 214. The pulsation of the field winding of the exciter 102 permits the cyclical variation of the inductance L(θ) of the field winding as a function of rotor position θ to be mapped into a lookup table which is accessed during motor operation to control commutation of the main inverter 114 driving the main motor generator 105 for starting a prime mover such as a gas turbine in an APU in an airplane without the use of expensive and often unreliable shaft position sensors.

While the invention has been described in terms of its preferred embodiments, it should be understood that numerous modifications may be made thereto without departing from the spirit and scope of the invention as defined in the appended claims. It is intended that all such modifications fall within the scope of the appended claims.

We claim:

1. A motor generator system comprising:

a prime mover for driving an output shaft;

a main motor and generator having a rotor, driven by the output shaft, for producing electrical power on at least one output winding in response to the prime mover rotating the output shaft and for driving the output shaft in response to operation as a motor;

an exciter having a rotor, driven by the output shaft, for applying excitation to a field winding of the main motor generator during operation for producing electrical power on the at least one output winding and for applying current to the field winding of the main motor generator to produce a magnetic field in the field winding during operation of the main motor generator as a motor;

circuitry, responsive to current in a field winding of the exciter, for producing an output signal representing a position of the rotor of the main motor generator; and a main inverter, responsive to the output signal, for commutating application of current to the at least one output winding to control operation of the main motor generator during operation as a motor.

2. A motor generator system in accordance with claim 1 wherein:

the circuitry is responsive to a variation in inductance of the field winding of the exciter for producing the output signal.

3. A motor generator system in accordance with claim 1 further comprising:

a periodic signal source producing a signal having a fundamental frequency above a highest commutation frequency of switching of switches in the main inverter during operation of the main motor generator as a motor, a pulse width modulator, responsive to at least the fundamental frequency of the signal having a fundamental frequency, for producing a pulse width modulated output signal having the fundamental frequency, and an exciter inverter, coupled to the field winding of the exciter and to the pulse width modulated output signal, for switching current flow through the field winding of the exciter to produce the fundamental frequency of the pulse width modulated output signal in the field winding.

4. A motor generator system in accordance with claim 3 wherein the circuitry comprises:

a first differentiation circuit, responsive to the pulse width modulated output signal and to the current in the exciter field winding, for producing an output of the slope of a change in time versus a change in current in the exciter field winding during each pulse of the pulse width modulated output signal which is a function of inductance of the exciter field winding as a function of the position of the rotor of the main motor generator; and a transformation circuit, responsive to the output of the first differentiation circuit, for producing an output signal which is a function of the position of the rotor of the main motor generator.

5. A motor generator system in accordance with claim 4 wherein the circuitry further comprises:

a divider, coupled to the output signal of the transformation circuit, for dividing the output signal of the transformation circuit by a number of pole pairs in the field winding of the exciter to produce the output signal representing the position of the rotor of the main motor generator.

6. A motor generator system in accordance with claim 4 further comprising:

a scaling circuit, coupled between an output of the first differentiation circuit and an input of the transformation circuit, for providing an output which is a scaling of the output of the first differentiation circuit so as to be independent of variation of a direct current voltage applied to the exciter inverter to produce current flow to the field winding of the exciter.

7. A motor generator system in accordance with claim 6 further comprising:

a first summer for providing a difference between a first input and a second input on an output coupled to the pulse width modulator, the first input being from the periodic signal source and the second input being a current feedback signal representative of the current in the field winding of the exciter with the first input being amplitude modulated with a signal proportional to a speed of the rotor of the main motor generator to decrease the first input as a function of an increase in the speed of the output shaft; and a second summer for providing a difference between a first input and a second input on an output which is applied to the scaling circuit for controlling scaling provided by the scaling circuit, the first input being a difference between positive and negative potentials of the direct current voltage applied to the exciter inverter and the second input being responsive to the current flow in the exciter winding and being a proportional to a voltage drop produced by a resistance of the field winding of the exciter in response to the flow of field current in the field winding of the exciter.

8. A motor generator system in accordance with claim 7 further comprising:

a second differentiation circuit, responsive to the output of the transformation circuit, for producing an output signal representing the speed of the rotor of the main motor generator with the output signal being the signal for amplitude modulating the fundamental frequency of the periodic signal source.

9. A motor generator system in accordance with claim 1 further comprising:

a permanent magnet generator; and wherein the permanent magnet generator, the exciter and the main motor and generator have three electrical phases and rotors mounted on the output shaft with the permanent magnet generator, exciter and main motor generator being brushless; and the prime mover is a gas turbine.

10. A motor generator system in accordance with claim 2 further comprising:

a permanent magnet generator; and wherein the permanent magnet generator, the exciter and the main motor and generator have three electrical phases and rotors mounted on the output shaft with the permanent magnet generator, exciter and main motor generator being brushless; and the prime mover is a gas turbine.

11. A motor generator system in accordance with claim 3 further comprising:

a permanent magnet generator; and wherein the permanent magnet generator, the exciter and the main motor and generator have three electrical phases and rotors mounted on the output shaft with the permanent magnet generator, exciter and main motor generator being brushless; and the prime mover is a gas turbine.

12. A motor generator system in accordance with claim 4 further comprising:

a permanent magnet generator; and wherein the permanent magnet generator, the exciter and the main motor and generator have three electrical phases and rotors mounted on the output shaft with the permanent magnet generator, exciter and main motor generator being brushless; and the prime mover is a gas turbine.

13. A motor generator system in accordance with claim 5 further comprising:

a permanent magnet generator; and wherein the permanent magnet generator, the exciter and the main motor and generator have three electrical phases and rotors mounted on the output shaft with the permanent magnet generator, exciter and main motor generator being brushless; and the prime mover is a gas turbine.

14. A motor generator system in accordance with claim 6 further comprising:

a permanent magnet generator; and wherein the permanent magnet generator, the exciter and the main motor and generator have three electrical phases and rotors mounted on the output shaft with the permanent magnet generator, exciter and main motor generator being brushless; and the prime mover is a gas turbine.

15. A motor generator system in accordance with claim 7 further comprising:

a permanent magnet generator; and wherein the permanent magnet generator, the exciter and the main motor and generator have three electrical phases and rotors mounted on the output shaft with the permanent magnet generator, exciter and main motor generator being brushless; and the prime mover is a gas turbine.

16. A motor generator system in accordance with claim 8 further comprising:

a permanent magnet generator; and wherein the permanent magnet generator, the exciter and the main motor and generator have three electrical phases and rotors mounted on the output shaft with the permanent magnet generator, exciter and main motor generator being brushless; and the prime mover is a gas turbine.

17. A method of commutation of a motor generator system having a prime mover for driving an output shaft, a main motor generator having a rotor driven by the output shaft for producing electrical power on at least one output winding in response to the prime mover rotating the output shaft and for driving the output shaft in response to operation as a motor, an exciter having a rotor, driven by the output shaft for applying excitation to a field winding of the main motor generator during operation for producing electrical power on the at least one output winding and for applying current to the field winding of the main motor generator to produce a magnetic field in the field winding during operation of the main motor generator during operation as a motor comprising:

applying excitation to a field winding of the exciter during operation of the main motor generator as a motor;

in response to the excitation of the field winding of the exciter producing a signal representing rotary position of the rotor of the main motor generator; and commutating the flow of current in the at least one output winding of the main motor generator in response to the signal representing rotary position of the rotor of the main motor generator to operate the main motor generator to drive the output shaft.

18. A method in accordance with claim 17 wherein:

the excitation of the field winding of the exciter to produce the signal representing rotary position of the rotor of the main motor generator is responsive to variation of inductance of the field winding of the exciter as a function of rotary position of the rotor of the main motor generator; and the variation of inductance of the field winding is transformed into the signal representing rotary position of the rotor of the main motor generator.

19. A method in accordance with claim 18 wherein:

the prime mover is an engine and the operation of the main motor generator is to start the engine.

20. A method in accordance with claim 19 wherein:

the motor generator system further comprises a permanent magnet generator; and wherein the permanent magnet generator, exciter and the main motor generator have three phases, are brushless and have rotors mounted on the output shaft; and the engine being started is a gas turbine.

21. A motor generator system comprising:

a main motor generator, having a rotor mounted on a shaft, for producing electrical power on at least one output winding in response to rotation of the output shaft and for driving the output shaft in response to operation as a motor;

an exciter, having a rotor mounted on the shaft, for applying excitation to a field winding of the main motor and generator during operation for producing electrical power on the at least one output winding and for applying current to the field winding of the main motor generator to produce a magnetic field in the field winding during operation of the main motor generator as a motor;

circuitry, responsive to current in a field winding of the exciter, for producing an output signal representing a position of the rotor of the main motor generator; and a main inverter, responsive to the output signal, for commutating application of electrical current to the at least one output winding to control operation of the main motor generator during operation as a motor.

\* \* \* \* \*